United States Patent [19]

Wolfe, Jr.

[11] Patent Number: 4,662,563

[45] Date of Patent: May 5, 1987

[54] CENTER PIVOT IRRIGATION SYSTEM

[76] Inventor: Donald J. Wolfe, Jr., 3972 N. Rd. 3 East, Monte Vista, Colo. 81144

[21] Appl. No.: 762,446

[22] Filed: Aug. 5, 1985

[51] Int. Cl.$^4$ .......................... B05B 12/12; B05B 17/04; B05B 3/00; A01G 25/09
[52] U.S. Cl. ............................................ 239/1; 239/63; 239/728
[58] Field of Search .............. 239/1, 63, 64, 67, 177.1, 239/183, 177.2, 710-721, 726-733; 137/78.3

[56] References Cited

U.S. PATENT DOCUMENTS

| | | | |
|---|---|---|---|
| 2,796,291 | 6/1957 | Mueller | 137/78.3 X |
| 3,836,078 | 9/1974 | Olson et al. | 239/177.1 |
| 3,843,056 | 10/1974 | Nye | 239/64 |
| 4,227,648 | 10/1980 | Holloway et al. | 239/177.2 X |
| 4,228,955 | 10/1980 | Petersen | 239/177.2 |
| 4,305,549 | 12/1981 | Hewitt | 239/177.2 |
| 4,463,906 | 8/1984 | Reinke et al. | 239/720 |

FOREIGN PATENT DOCUMENTS 0076014  4/1983  European Pat. Off. .............. 239/67

Primary Examiner—Andres Kashnikow
Assistant Examiner—Mary Beth O. Jones
Attorney, Agent, or Firm—Robert J. Koch

[57] ABSTRACT

A center pivot irrigation system with a controller for automatically starting and stopping the irrigation system based on the moisture level of the soil. A moisture level sensor is provided to detect the moisture level of the soil in the field at the predetermined location. When the moisture level falls below a predetermined level, a center pivot irrigation cycle is initiated. At least one complete irrigation cycle will be completed regardless of the status of the moisture sensor. Once started, the irrigation arm will continue irrigating until it reaches a preset stopping location. If, when reaching that location, the moisture sensor is still calling for additional irrigation of the field, a stop override will prevent the irrigation arm from stopping at the preset location and the irrigation arm will continue irrigating at least until it reaches the preset stopping location again.

20 Claims, 2 Drawing Figures

CENTER PIVOT IRRIGATION SYSTEM

BACKGROUND OF THE INVENTION

1. Field of the Invention

This invention relates to a center pivot irrigation system and more particularly to a moisture activated control for the center pivot irrigation system.

2. Description of the Prior Art

Center pivot irrigation systems are made up of an irrigation arm extending radially outward from a center pivot. When activated the irrigation arm rotates over a period of time around the pivot thereby watering the area that the arm passes over. The length involved in a 360 degree rotation of the irrigation arm may be up to several days.

The center pivot system is generally driven by electric motors and may include a pumping system to control the pressure of the water supply. The control of known systems may be either manual or semiautomatic. A farmer is required to start and stop the system by going to the system controller and manually actuating control switches. It is known to provide the system with a limit switch activated by the position of the irrigation arm in order to shut down the system. The limit switch is usually mounted on the center pivot and is activated by a stop cam on the radial arm of the center pivot. The limit switch must be set manually each time the farmer wants to stop the system. Once the limit switch is set the most the pivot can rotate would be a single revolution. Because of the limited range of this type of semiautomatic shut-off, the farmer is often required to make a separate trip into the field to either restart the system after it has been stopped or set the limit switch to stop when he feels the field is sufficiently watered.

Another feature of known irrigation systems is a pressure safety shut-off switch. This services to shut down the system when water pressure is lost, due to for example pump failure or a power outage. A further disadvantage of the known system is that this pressure safety switch must be manually overridden when starting the system because there is no pressure in the water supply at the start of operation.

The known center pivot systems require near constant attention by a farmer. He must carefully pay attention to the soil and weather conditions in order to determine when and how much to water. A great amount of waste occurs in the pumping, power, and water costs, when a field is overwatered. Known systems further result in high fertilizer costs due to leaching as well as high farmer transportation costs, i.e., pickup trucks to transport the farmer to the controller and maintenance of transportation and the irrigation system itself.

SUMMARY OF THE INVENTION

It is therefore an object of the invention to efficiently and automatically control a center pivot irrigation system.

It is a further object of the invention to control the center pivot so as to maintain an optimum moisture level in the soil. By automatically maintaining the soil moisture level in a predetermined optimum range, increased crop quality and yield are realized. Further savings are realized in pumping, water, fertilizer and maintenance and repair costs. Irrigating according to actual crop usage and soil conditions saves water costs and relieves the farmer of constant monitoring of the field and/or the burden of conducting elaborate research to determine a correct irrigation schedule.

According to the invention, the center pivot irrigation system has a limit switch configured to stop the pivot arm at a predetermined position. A moisture sensor is provided in the field covered by the irrigation system. The sensor is preferably located at a distance ahead of the predetermined location so that it is not watered when the irrigation arm is at or immediately approaching the predetermined stopping location.

When the level of moisture in the field falls below a predetermined level, as detected by the sensor, irrigation is initiated. The sensor serves only to start irrigation and not to stop it. The pivot will make a complete revolution and stop only when the positional limit switch is engaged at the predetermined location. Another function of the moisture sensor is to override the function of the limit switch so that when the sensor is calling for water the irrigation arm will not stop at the predetermined location but will continue for at least another rotation. The sensors may advantageously monitor the soil moisture level continuously.

According to another feature of the invention, several moisture sensors may be disbursed on the field and more than one positional limit switch cam may be used. The sensors are connected in parallel so that if any one of them calls for watering, the positional limit switch is overridden so that irrigation continues. The number of positional limit switch cams each designate a different predetermined stopping location. Although the number of predetermined locations need not equal the number of moisture sensors, it is convenient to configure the system with a moisture sensor ahead of the range of watering of the irrigation arm at each predetermined stopping location.

The advantage of providing a plurality of moisture sensors and multiple stopping positions of the irrigation arm results in increased operating efficiency. If during a watering cycle it starts raining and a sufficient amount of rain falls to raise the soil moisture levels at all of the moisture sensors above the predetermined level, irrigation will stop when the irrigation arm reaches the next stopping position. Stopping at that position may be far short of a full 360° watering cycle thus reducing the operating time of the center pivot irrigation system. An additional advantage is that the plural moisture sensors and stopping positions act as a backup in case of failure of one of the sensors or stopping position cams.

According to another feature of the invention, a low pressure safety shutdown function is provided with an override. When automatically starting the system, the pressure safety shutdown is automatically overridden for a short period of time so that the system has a chance to pressure up.

Another feature of the invention are status indicating lights or beacons. The beacons may be of different colors so as to indicate to the farmer at a distance the operating status of the irrigation system. The types of status light contemplated include, but are not limited to, a field moisture beacon indicating when watering is being called for, individual sensor beacons or local indicator lights indicating when each particular sensor is calling for water located at the controller, a center pivot running beacon indicating when irrigation is taking place, and a ready status beacon indicating when the control circuit is ready and operating.

According to another feature of the invention, an hour meter is provided to measure the irrigation time of the system. This feature is advantageous in that it allows the farmer to accurately determine the amount of water applied to the field.

The foregoing and other features, objects and advantages will be further appreciated from the following description.

DETAILED DESCRIPTION OF THE PREFERRED EMBODIMENT

Figure 1:
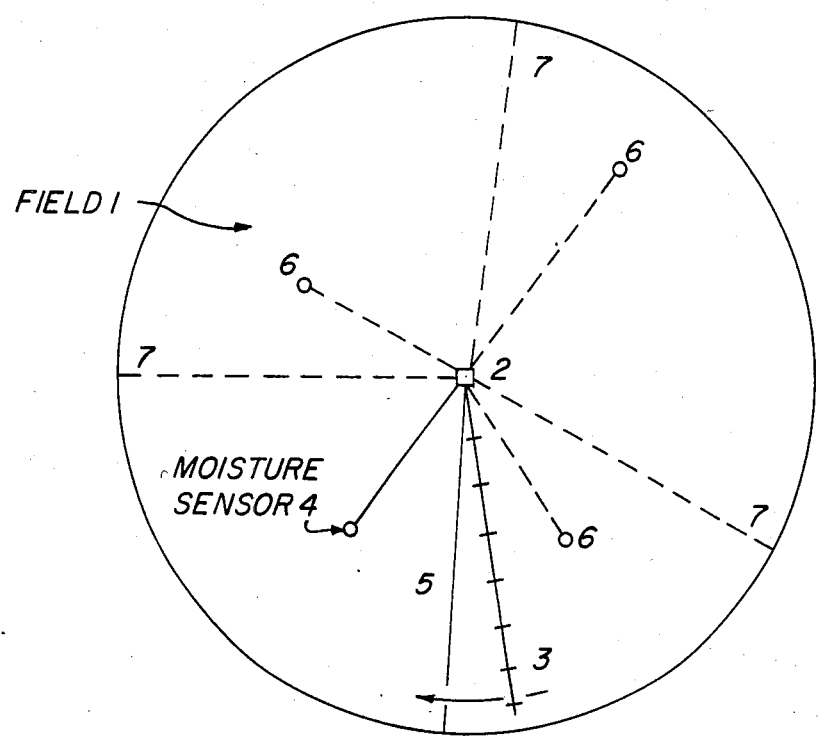
FIG. 1 shows a center pivot irrigation system layout.

FIG. 1 shows a typical center pivot irrigation system according to the invention. Field 1 is the area covered by the center pivot irrigation system. The center pivot 2 is located in the center of the field and the controller is preferably mounted in the same location. When operating the irrigation arm 3 rotates around the center pivot thereby irrigating the portion of the field it sweeps over. A moisture sensor 4 detects when the moisture level of the soil falls below a preset level and initiates irrigation of the field. When the irrigation arm reaches the predetermined stopping position 5, it will automatically stop unless the moisture level at the sensor 4 is below a certain level, in which case irrigation will continue for at least another cycle.

The irrigation system may be provided with additional moisture sensors 6 and stopping positions 7. It is preferable to position the moisture sensors ahead of the stopping position and out of the range of the irrigation arm when it is in the stopping position.

Figure 2:
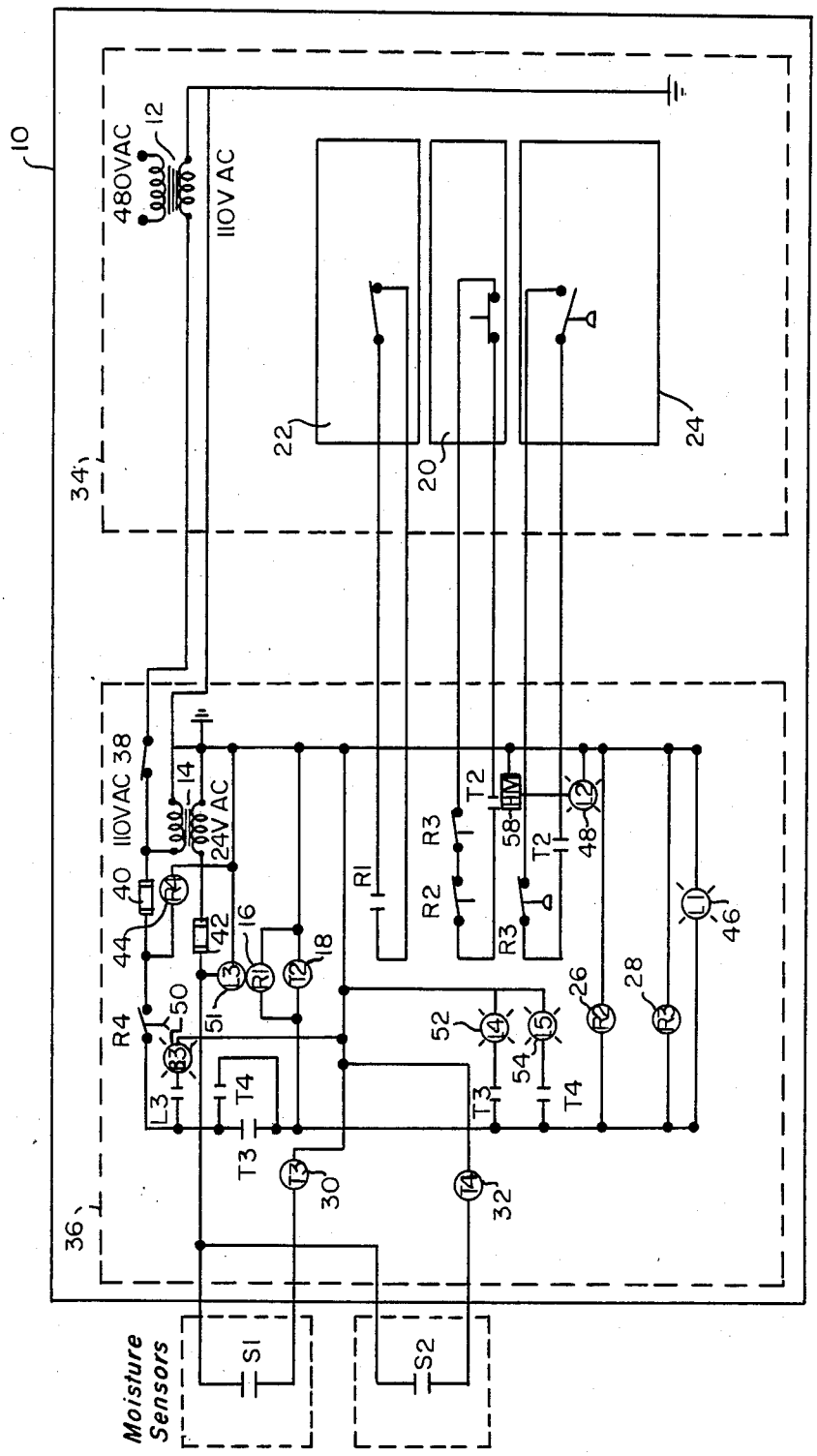
FIG. 2 shows a center pivot controller schematic.
Figure 2:
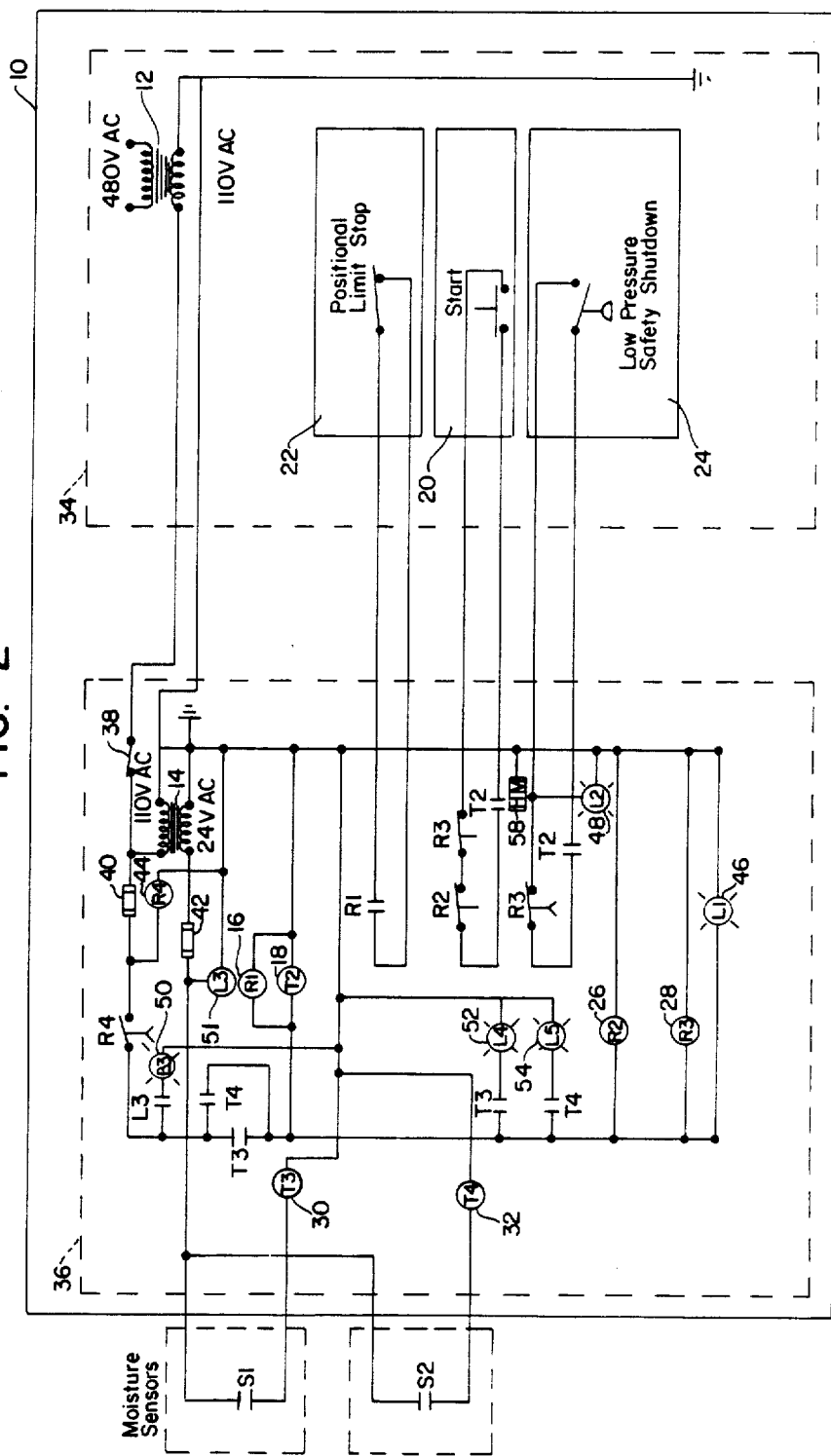

FIG. 2 shows the configuration of the controller 10. Generally, a 480 volt power source is used to power the irrigation system. Transformer 12 steps the power down to 110 volts for utilization by the controller. Transformer 14 is provided to step down the level to 24 volts in order to supply the moisture sensors 4 and 6. The controller has a start control 20 to activate the system and commence irrigation. The controller is also provided with a positional limit stop 22 to stop irrigation when the irrigation arm reaches a preset location and a low pressure safety shutdown section 24 to stop irrigation when the water pressure falls below a certain level.

When the moisture sensor 4 detects when the moisture level is below predetermined level it activates both relays R1 16 and T2 18, R2 26 and R3 28. The T2 relay serves to enable both the starting circuit and a low pressure safety shutdown override circuit. R2 is a normally closed time delayed relay which serves, in the starting circuit, to maintain contact for long enough to start the irrigation system. R3 is similarly a time delayed normally closed relay which serves during the delay period to override the low pressure safety shutdown circuit 24. R1 operates to override the positional limit stop circuitry 22 when the moisture sensor 4 is below the predetermined moisture level and is calling for additional irrigation.

When the system is configured with additional moisture sensors 6, all of the moisture sensors are connected in parallel. In the exemplary embodiment shown, the two moisture sensors 4 and 6 are provided with individual relays T3 30 and T4 32, respectively. One of the relays T3 or T4 must be activated to enable operation of relays T2, R1, R2, and R3.

According to a feature of the invention, the controller may be divided into two functional segments, an operational control segment 34 or main controller which serves to operate the irrigation system and an automatic control segment 36 or auxiliary controller which serves to automatically initiate the operational control of the irrigation system. Switch 38 is connected in the system to control power supply to the automatic control segment 36. Fuses 40 and 42 are provided for additional protection of the electrical circuitry contained within the automatic control segment. Normally open time delay relay R4 44 is also provided for additional protection.

According to an advantageous feature of the invention, status indicator beacons may also be provided in the control circuitry. Moisture sensor monitoring beacon L1 46 is activated when any one of the moisture sensors detects a moisture level below a predetermined level. Center pivot monitor beacon L2 48 is activated whenever the irrigation system is operating to irrigate the field. Ready status indicator beacon B3 50 is activated by relay L3 51 and is illuminated whenever the automatic control selection is in an operational state. Moisture sensor beacons L4 52 and L5 54 are connected to relays T3 and T4 respectively and operate whenever their respective moisture sensors sense a moisture level below the set predetermined level.

A further advantageous embodiment of the invention includes an hour meter 58 connected in the controller so as to time the operation of the irrigation arm. This timing allows the farmer to calculate the amount of water used during the particular growing season. FIG. 2 also shows the contacts of relay R2 and R3 connected in series in the automatic starting circuit. The redundancy employed here is for the purpose of protecting against a failure of relay R2. The starting circuitry 20 only requires a momentary contact in order to start the system. Therefore, the delay on R2 may be set in the range of 1 to 3 seconds. It often takes a much longer period of time for the supply pressure to build up in the system. In order to prevent low pressure safety shutdown, the delay period of relay R3 can be set for up to 15 minutes.

While the invention has been particularly shown and described with reference to a preferred embodiment thereof, it will be understood by those skilled in the art that various changes in form and detail may be made therein without departing from the spirit and scope of the invention.

What is claimed is:

1. A center pivot irrigation system for automatically irrigating a field comprising:
    a center pivot;
    an irrigation arm extending radially outward from said center pivot for rotation around said center pivot and irrigating an area traversed by said irrigation arm;
    means for sensing moisture level at a predetermined location in the field;
    means for controlling irrigation connected to said irrigation arm wherein said means for controlling irrigation comprises:
       means for starting said irrigation arm and initiating said rotation at a moisture level below a predetermined moisture level responsive to said means for sensing moisture;
       means for positional shutoff of said irrigation and arm rotation when the irrigation arm reaches a predetermined rotational position, connected to the irrigation arm;
       means for overriding positional shutoff when the moisture level is below the predetermined moisture level connected to said means for positional shutoff and responsive to said means for sensing.

2. A center pivot irrigation system as in claim 1 wherein said means for sensing further comprises a plurality of sensor means distributed in a plurality of predetermined locations; and
said means for positional shutoff further includes means for stopping the irrigation and arm rotation at a plurality of predetermined locations.

3. A center pivot irrigation system as in claim 2 wherein said means for controlling further comprises:
means for stopping said irrigation arm when water pressure drops below a predetermined level; and
means for temporarily overriding said means for stopping when the moisture level reaches said predetermined level connected to said means for sensing.

4. A center pivot irrigation system as in claim 3 wherein the means for controlling further comprises means for displaying status of the system.

5. A center pivot irrigation system as in claim 4 wherein the means for controlling further comprises means for recording a cumulative time interval between the starting of said irrigation arm and the shutoff of said irrigation arm.

6. A center pivot irrigation system as in claim 1 wherein said means for controlling further comprises:
means for stopping said irrigation arm when water pressure drops below a predetermined level; and
means for temporarily overriding said means for stopping when the moisture level reaches said predetermined level connected to said means for sensing.

7. A center pivot irrigation system as in claim 1 wherein the means for controlling further comprises means for displaying status of the system.

8. A center pivot irrigation system as in claim 1 wherein the means for controlling further comprises means for recording a cumulative time interval between the starting of said irrigation arm and the shutoff of said irrigation arm.

9. A method of controlling a center pivot irrigation system with an irrigation arm for automatically irrigating a field comprising the steps of:
continuously sensing soil moisture level at a predetermined location;
starting rotation of a center pivot irrigation arm and fluid output of said irrigation system when the soil moisture level falls below a predetermined value;
stopping the rotation and fluid output of the irrigation system when the irrigation arm reaches a predetermined position;
overriding the step of stopping if the soil moisture level is below the predetermined value when the irrigation arm reaches the predetermined position.

10. A method of controlling a center pivot irrigation system as in claim 9 wherein the system includes a low water pressure shutdown function further comprising the step of temporarily overriding the low water pressure shutdown function when the soil moisture level reaches the predetermined value.

11. A method of controlling a center pivot irrigation system as in claim 9 wherein the step of sensing further comprises sensing soil moisture levels at a plurality of predetermined locations;
the step of starting further comprises starting the irrigation system when the moisture level at any of the predetermined locations falls below the predetermined value; and
the step of stopping further comprises stopping the irrigation system when the irrigation arm reaches any of a plurality of predetermined positions.

12. A method of controlling a center pivot irrigation system as in claim 10 further comprising the step of displaying status of the irrigation system.

13. A method of controlling a center pivot irrigation system as in claim 12 further comprising the step of:
recording a cumulative time interval between starting and stopping said irrigation system.

14. A method of controlling a center pivot irrigation system as in claim 9 further comprising the step of displaying status of the irrigation system.

15. A method of controlling a center pivot irrigation system as in claim 9 further comprising the step of:
recording a cumulative time interval between starting and stopping said irrigation system.

16. An auxiliary controller for a center pivot irrigation system with a main controller and an irrigation arm extending radially outward from a center pivot controllable to rotate around the center pivot to irrigate an area traversed by the irrigation arm and for stopping arm rotation and irrigation when a preset position of the irrigation arm is reached comprising:
means for sensing moisture level at a predetermined location in the field;
means for automatically starting rotation and fluid output of the irrigation arm when the moisture level falls below a predetermined level responsive to said means for sensing; and
means for overriding the stopping of the arm rotation and irrigation when the moisture level is below the predetermined moisture level responsive to the means for sensing moisture level.

17. An auxiliary controller as in claim 16, wherein the main controller includes a low pressure safety shutdown function, further comprising means for overriding the low pressure safety shutdown function when the moisture level falls below the predetermined level, responsive to the means for sensing.

18. An auxiliary controller as in claim 17, wherein the stopping of the arm rotation and irrigation occurs at a plurality of preset positions, and the means for sensing moisture level further comprises a plurality of moisture sensor means.

19. An auxiliary controller as in claim 18 further comprising means for displaying the status of the system.

20. An auxiliary controller as in claim 19 further comprising means for recording a cumulative time interval between the starting of said irrigation arm and the shutoff of said irrigation arm.

* * * * *

UNITED STATES PATENT AND TRADEMARK OFFICE
CERTIFICATE OF CORRECTION

PATENT NO.  : 4,662,563                                    Page 1 of 2

DATED       : May 5, 1987

INVENTOR(S) : Donald J. Wolfe, Jr.

It is certified that error appears in the above-identified patent and that said Letters Patent is hereby corrected as shown below:

Figure 2 should be deleted to appear as per attached sheet.

Signed and Sealed this

Sixth Day of October, 1987

Attest:

DONALD J. QUIGG

Attesting Officer

Commissioner of Patents and Trademarks